United States Patent [19]

Bucska et al.

[11] Patent Number: 5,710,680

[45] Date of Patent: Jan. 20, 1998

[54] MAGNETIC HARD DISK DRIVE HEAD SUSPENSION APPARATUS

[75] Inventors: Nicholas J. Bucska, 2135 Meadow St., Apt. 8, Longmont, Colo. 80501; Robert P. Wing, 3556 Smuggler Way, Boulder, Colo. 80303

[73] Assignees: PC Peripherals Inc., Broomfield; Nicholas J. Bucska, Longmont; Robert P. Wing, Boulder, all of Colo.

[21] Appl. No.: 577,276

[22] Filed: Dec. 22, 1995

[51] Int. Cl.⁶ .................... G11B 5/48; G11B 21/16
[52] U.S. Cl. .................................................. 360/104
[58] Field of Search ................... 360/103, 104, 360/105, 106, 98.01, 98.02

[56] References Cited

U.S. PATENT DOCUMENTS

| | | | |
|---|---|---|---|
| 4,800,455 | 1/1989 | Takizawa | 360/104 |
| 4,835,641 | 5/1989 | Maeda | 360/104 |
| 4,891,723 | 1/1990 | Zak | 360/106 |
| 4,916,342 | 4/1990 | Hirano et al. | 360/106 |
| 4,937,693 | 6/1990 | Connolly et al. | 360/106 |
| 5,027,241 | 6/1991 | Hatch et al. | 360/105 |
| 5,027,242 | 6/1991 | Nishida et al. | 360/106 |
| 5,172,287 | 12/1992 | Ishida | 360/105 |
| 5,189,577 | 2/1993 | Nishida et al. | 360/106 |
| 5,202,863 | 4/1993 | Miyatake et al. | 360/104 |
| 5,218,496 | 6/1993 | Kaczeus | 360/106 |
| 5,225,949 | 7/1993 | King et al. | 360/104 |
| 5,343,345 | 8/1994 | Gilovich | 360/104 |
| 5,343,347 | 8/1994 | Gilovich | 360/106 |
| 5,381,289 | 1/1995 | Fiedler | 360/104 |
| 5,390,058 | 2/1995 | Yamaguchi | 360/104 |
| 5,390,059 | 2/1995 | Tokuyama et al. | 360/104 |
| 5,418,666 | 5/1995 | Mihara et al. | 360/106 |
| 5,528,819 | 6/1996 | McKay et al. | 29/603.07 |

FOREIGN PATENT DOCUMENTS

| | | | |
|---|---|---|---|
| 53-138314 | 12/1978 | Japan | 360/106 |
| 02216681 | 8/1990 | Japan | 360/106 |
| 03214469 | 9/1991 | Japan | 360/106 |

*Primary Examiner*—Stuart S. Levy
*Assistant Examiner*—William J. Klimowicz
*Attorney, Agent, or Firm*—Sheridan Ross P.C.

[57] ABSTRACT

A magnetic disk storage device is provided in which two magnetic heads for reading and writing information to the adjacent surfaces of spaced disks are mounted on a single arm. The heads are longitudinally displaced along the single arm to permit decreased disk-to-disk spacing.

3 Claims, 5 Drawing Sheets

MAGNETIC HARD DISK DRIVE HEAD SUSPENSION APPARATUS

FIELD OF THE INVENTION

The present invention relates generally to the field of hard disk storage devices and, more particularly, to small multiple disk drives.

BACKGROUND OF THE INVENTION

Hard disk storage devices include at least one rotating magnetic disk and a magnetic head that reads and writes data along concentric tracks on the disk. Some storage devices include a stack of multiple disks to increase storage capacity. Continuing growth in the demand for disk storage capacity may be met by increasing the number of disks in a stack. However, increasing the number of stacked disks increases the volume needed to package the storage device, and in many applications the volume available for the disk storage device is severely constrained.

One of the factors that affects the volume of the packaging is the height of the disk stack. In addition to the number and thickness of the disks in the stack, the height of the stack is affected by the configuration of the mechanism used to position the magnetic heads used to read and write data on the disks. Generally, a magnetic head is mounted to a movable arm by means of a flexible member. The arm is positioned so that the magnetic head is located adjacent to the surface of the disk. The arm is moved to position the head to read or write data on different concentric tracks of the disk. In some configurations, the head may move in a linear path across the disk surface. In one linear configuration, multiple heads which are displaced along the direction of travel are used to provide access to the entire surface of a disk without the necessity of moving a single head across all of the tracks of the disk. In other configurations, the arm is rotatably mounted, causing the head to move in an arcuate path across the disk surface.

In multiple disk configurations where both sides of each disk are being accessed, it is necessary to position at least two heads, each facing a disk surface, in the gap between the opposed disk faces of adjacent disks. This gap, or disk spacing, is an important factor in determining the overall height of the drive. Various configurations have been used to position heads in the gap. In one configuration, two heads are mounted on a single arm with one head directly above another such that each head traces the same arcuate path. In several different known configurations, two cantilevered arms are used, each attached to a single head. One such configuration employs two interleaved arms. Another employs a pair of arms which are located side by side. A further configuration employs a pair of arms positioned at an acute angle to each other.

SUMMARY OF THE INVENTION

The present invention provides an improved disk drive apparatus for the storage of information. In particular, the arm configurations of the present invention permit decreased spacing between adjacent disks in a disk stack, allowing a reduction in the volume of the disk drive apparatus. The present invention provides the advantage of reduced spacing between adjacent disks by the use of two magnetic heads which are mounted on a single arm and displaced from each other along the longitudinal axis of the arm. The longitudinal displacement of the heads permits the heads to be offset in a direction perpendicular to the disk surfaces, thereby permitting the perpendicular distance between adjacent disk surfaces to be less than that required in the case of heads which are not offset. The present invention also a provides a structure which may be efficiently and economically produced.

The various aspects of the present invention are embodied in a disk drive apparatus that includes a disk stack, a positioning arm, magnetic heads and spring mounts. The disk stack rotates on an axis and includes multiple disks spaced along the axis of rotation. The magnetic heads are attached to the positioning arm by the spring mounts and the heads are used to read and write information to the surfaces of the disks in the disk pack. The positioning arm pivots about an axis parallel to the axis of rotation of the disk pack and may be moved to position the heads in relation to different locations on the surface of adjacent disks, thus allowing access to different disk tracks.

In one embodiment, a portion of the positioning arm is located between the two disks in the disk stack. Two heads are mounted on the arm. One head reads and writes information on the lower surface of the adjacent upper disk and the other head reads and writes information on the upper surface of the adjacent lower disk. One head is longitudinally displaced from the other, in that one head is farther from the axis of rotation of the arm than the other head. Each head is attached to a spring mount, which is connected to a surface of the arm. The arm includes a bent portion, which causes a portion of the arm to be closer to the surface of the adjacent lower disk than another other portion of the arm. The head which reads and writes information on the upper disk is attached to the portion of the arm which is closer to the adjacent lower disk and the head which reads and writes information on the lower disk is attached to the portion of the arm which is closer to the adjacent upper disk.

In a further embodiment, the arm includes a folded portion which similarly provides a portion of the arm which is closer to an adjacent disk. The heads are similarly longitudinally displaced and attached to the arm by spring mounts. The head which is mounted on the closer portion protrudes through a aperture in the opposed portion of the arm to have access to the surface of the other adjacent disk.

In a still further embodiment, the two heads are longitudinally displaced and both heads are positioned to protrude through an aperture in the arm in opposite directions. Each head is mounted on the arm using spring mounts attached to opposite surfaces of the arm.

In a yet further embodiment, the two heads are longitudinally displaced and the heads are attached to spring mounts formed from the material of the arm.

BRIEF DESCRIPTION OF THE DRAWINGS

For a more complete understanding of the present invention and further advantages thereof, reference is now made to the following Detailed Description, taken in conjunction with the Drawings, in which.

DETAILED DESCRIPTION OF THE INVENTION

Figure 1:
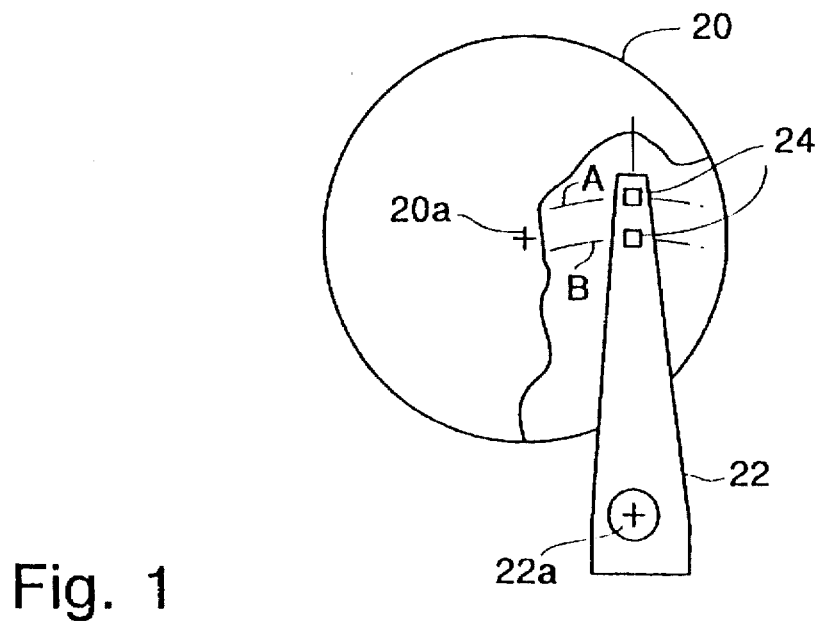
FIG. 1 is a top view of a portion of magnetic disk storage system according to the present invention.

A magnetic disk drive apparatus is illustrated in FIG. 1 that includes a disk stack 20 and a positioning arm 22. The disk stack 20 is made up of multiple disks lying in parallel planes perpendicular to the axis of rotation of the disk stack 20a. The positioning arm 22 is rotatably mounted to a base, not shown, such that the arm 22 may pivot about axis 22a. The arm is caused to pivot by actuation means, not shown. The distal end of the arm 22 is located in the gap between two adjacent disks in the disk stack 20. A portion of the upper disk has been removed to show the location of the distal end of the arm. Two magnetic heads 24 are mounted to the distal end of the arm 22. Each head 24 is adapted for reading and writing of information on an adjacent disk surface. The heads 24 trace the respective concentric arcuate paths A and B across adjacent disk surfaces when the arm 22 pivots about axis 22a, permitting the heads 24 to read and write information at various locations of the disks. The head which is farther from the axis of rotation of the arm traces a longer arcuate path A than the other head. As a result, the farther head covers more of the surface of its adjacent disk. The difference in the coverage areas of the heads may be reduced by reducing the longitudinal displacement between the heads. If it is desired to provide faster access to the surfaces of both disks, a pair of arms, each having two longitudinally displaced heads, may be employed by using two heads, one on each arm, to read separate areas of each disk surface. In addition, multiple pairs of heads may be mounted on a single arm to access different portions of the adjacent disk surfaces.

Figure 2:
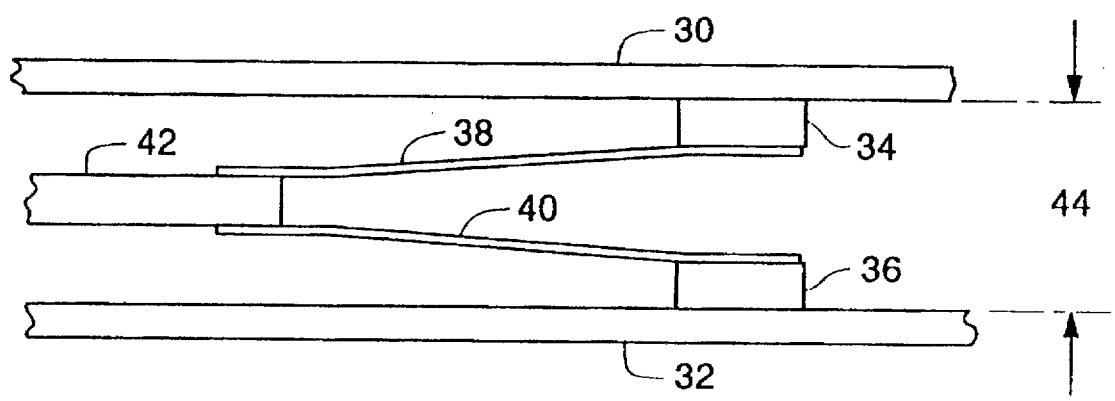
FIG. 2 is a partial side view of a prior art configuration showing two vertically aligned magnetic heads.

An example of a prior art arm configuration is shown in FIG. 2. A rigid actuator 42 is located between upper disk 30 and lower disk 32. An upper head 34 is attached to the actuator 42 by upper arm 38 and a lower head 36 is attached to the actuator 42 by lower arm 40. The heads are aligned vertically and thus trace the same arcuate path across the adjacent surfaces of the respective disks. Each of the arms 38, 40 are typically biased to urge the head attached to the arm toward the adjacent disk surface. Each head thus may move independently of the other in a generally vertical arc having a radius substantially equivalent to the length of the arm. Each head is typically attached to a portion of the arm which permits movement of the head with respect to the main portion of the arm, as is necessary to properly position the head with respect to the adjacent disk surface while the disk stack 20 is spinning.

In the prior art configuration shown in FIG. 2, the minimum distance 44 between the adjacent surfaces of upper disk 30 and lower disk 32 is limited by several factors. Since the heads are aligned vertically, the minimum distance must be at least twice the height of each head. In addition, the profile of the arms which are used also limits minimum distance 44.

Figure 3:
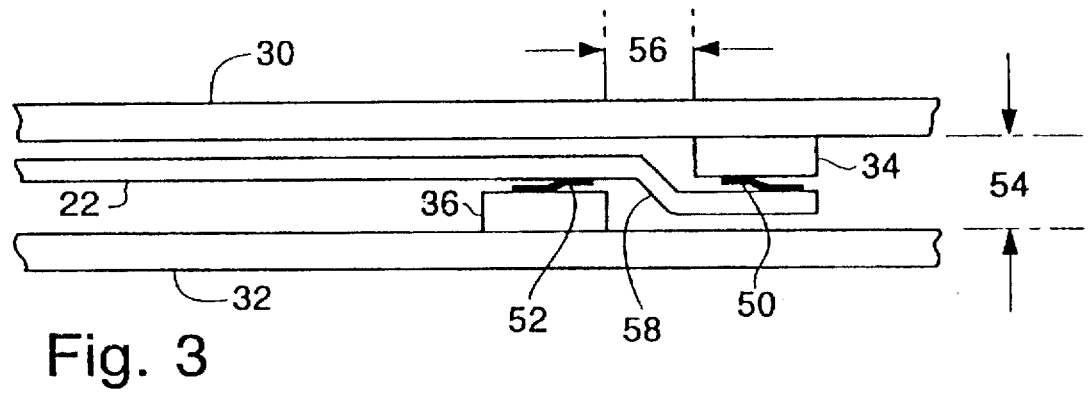
FIG. 3 is a partial side view of two displaced heads mounted on a single bent arm according to the present invention showing reduced distance between disks.
Figure 4:
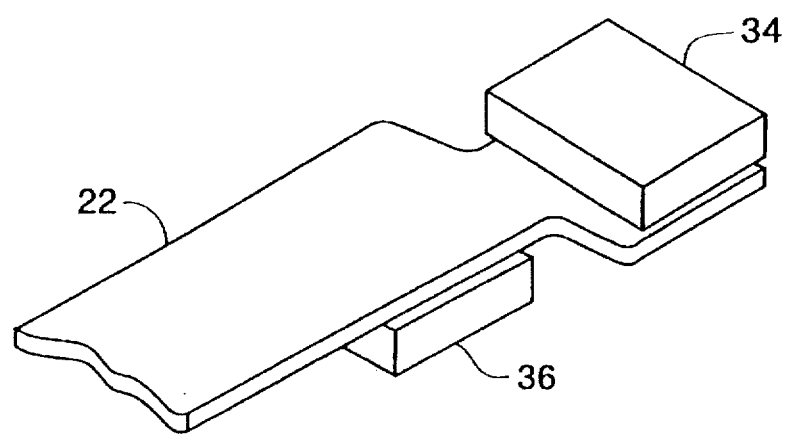
FIG. 4 is a perspective view of the arm configuration shown in FIG. 3.

An embodiment of an arm configuration according to the present invention is shown in FIG. 3 and FIG. 4. A portion of arm 22 is located between upper disk 30 and lower disk 32. Upper head 34 is positioned to permit reading and writing of information on the adjacent surface of upper disk 30. Similarly, lower head 36 is positioned to permit reading and writing of information on the adjacent surface of lower disk 32. The heads are displaced from each other along the longitudinal axis of the arm 22. The arm 22 includes a bend portion 58, causing the distal end of the arm 22 to be displaced in a direction parallel to the axis of rotation 22a shown in FIG. 1. Although the embodiment shown in FIG. 3 and FIG. 4 includes a bend portion 58 which is generally "S" shaped, it should be appreciated that the axial displacement of the distal portion of the arm 22 may be achieved by a variety of differently shaped bends or steps. The longitudinal distance 56 between lower head 36 and upper head 34 must be sufficient to accommodate the bend portion 58, but preferably is as small as possible to minimize the difference in the arcuate paths traced by the heads across each adjacent disk surface.

The upper head 34 is mounted on the arm 22 by an upper spring mount 50, which is attached to a surface of the arm 22 and a surface of the upper head 34. The upper spring mount 50 may take various shapes, but is adapted to urge the upper head 34 towards the adjacent surface of upper disk 30. In addition, the upper spring mount 50 is adapted to permit the face of the upper head 34 to tilt slightly with respect the plane established by the adjacent surface of upper disk 32.

The lower head 36 is mounted to the arm 22 in similar fashion. A lower spring mount 52 is attached to a surface of the arm 22 and a surface of the lower head 36. The lower spring mount 52 may take various shapes, and may differ in configuration from the upper spring mount 50. The lower spring mount 52 is adapted to urge the lower head 36 towards the adjacent surface of lower disk 32. In addition, the lower spring mount 52 is adapted to permit the face of the lower head 36 to tilt slightly with respect the plane established by the adjacent surface of lower disk 32.

It may be seen from FIG. 3 that the longitudinal displacement of the heads and the axial displacement of the distal portion of the arm 22 permits the minimum axial distance 54 between the adjacent surfaces of upper disk 30 and lower disk 32 which may be less than the minimum distance 44 of the prior art configuration shown in FIG. 2. The minimum distance 54 may be less than the sum of the axial distances from the face of each head to the attachment point of each associated spring mount on the arm 22. Preferably, the axial displacement between the face of upper head 34 and the face of lower head 36 is less than the sum of the axial thickness of upper head 34 and the axial thickness of lower head 36. It should be noted that the axial distance between the uppermost surface of the interior portion of arm 22 and the lowermost surface of the distal portion of the arm 22 is generally less than the axial distance between the faces of the upper and lower head when the drive is in operation to avoid contact between the arm and the disks.

Figure 5:
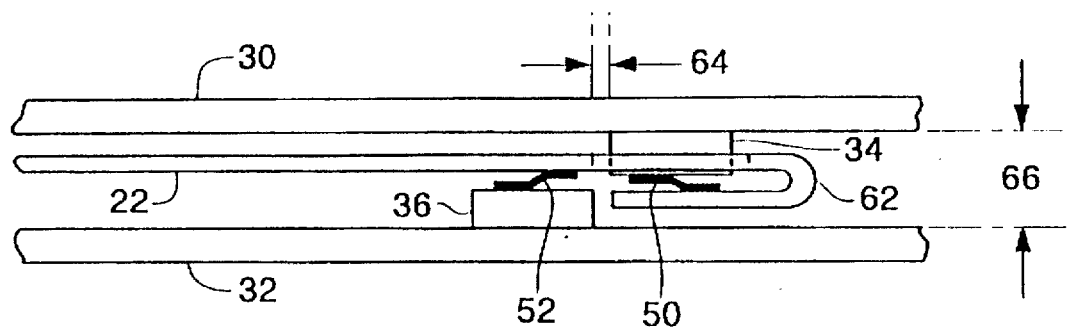
FIG. 5 is a partial side view of single arm configuration according to the present invention where a magnetic head is positioned within an aperture in the arm.
Figure 6:
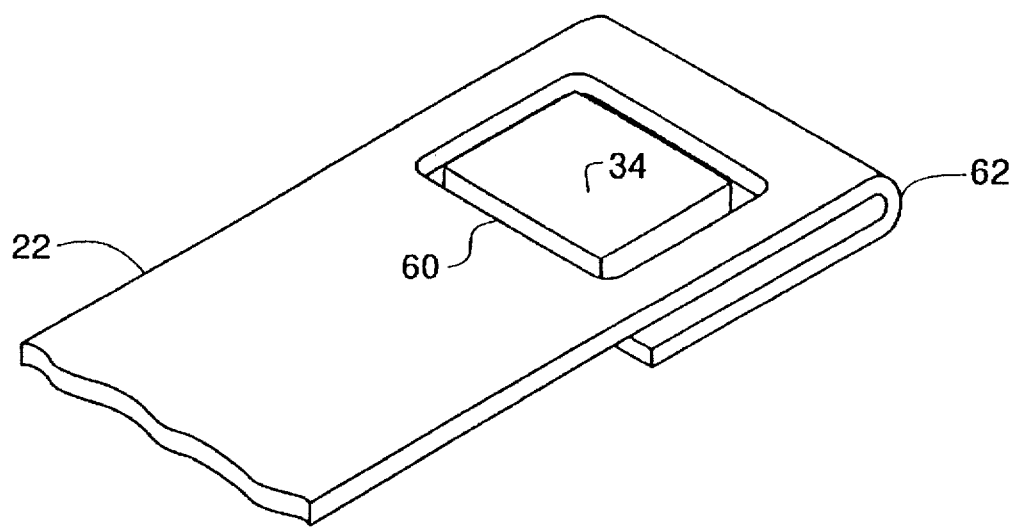
FIG. 6 is a perspective view of the arm configuration shown in FIG. 5 showing the positioning of the magnetic head in the aperture.

FIGS. 5 and 6 show an embodiment of an arm configuration according to the present invention where an aperture 60 is provided in the arm 22 and upper head 34 is positioned to protrude through the aperture 60. As FIG. 6 shows, the aperture 60 is sized so that the upper head 34 is positioned within the aperture without coming into contact with the edges of the aperture 60. The arm 22 also includes a fold portion 62. The fold portion 62 permits the arm 22 to have axially displaced surfaces for mounting of the magnetic heads 34 and 36.

Referring to FIG. 5, a portion of arm 22 is located between upper disk 30 and lower disk 32. Upper head 34 is positioned to permit reading and writing of information on the adjacent surface of upper disk 30. Similarly, lower head 36 is positioned to permit reading and writing of information on the adjacent surface of lower disk 32. The heads are displaced from each other along the longitudinal axis of the arm 22. Fold portion 62 creates a surface of the arm 22 which is displaced in a direction parallel to the axis of rotation 22a shown in FIG. 1. Although the embodiment shown in FIG. 5 includes a fold portion 62 which is generally "U" shaped, it should be appreciated that the axially displaced surface of the arm 22 may be achieved by a variety of differently shaped bends or steps. The longitudinal distance 64 between lower head 36 and upper head 34 must be sufficient to provide clearance between the heads but preferably is as small as possible to minimize the difference in the arcuate paths traced by the heads across each adjacent disk surface. The embodiment shown in FIG. 5 permits the longitudinal distance 64 between the heads to be less than the longitudinal distance 56 shown in FIG. 3.

The upper head 34 is mounted on the arm 22 by an upper spring mount 50, which is attached to the axially displaced surface of the arm 22 and a surface of the upper head 34. The upper spring mount 50 may take various shapes, but is adapted to urge the upper head 34 towards the adjacent surface of upper disk 30. In addition, the upper spring mount 50 is adapted to permit the face of the upper head 34 to tilt slightly with respect the plane established by the adjacent surface of upper disk 30.

The size and shape of aperture 60 must be sufficient to prevent the upper head 34 from contacting the edges of the aperture 60 even when the head is tilted, at least to the extent typically encountered during operation of the drive device.

The lower head 36 is mounted to the arm 22 in similar fashion. A lower spring mount 52 is attached to a surface of the arm 22 and a surface of the lower head 36. The lower spring mount 52 may take various shapes, and may differ in configuration from the upper spring mount 50. In particular, the upper spring mount 50 may differ in configuration from lower spring 52 to compensate for biasing towards upper disk 30 which may result from the inclusion of fold portion 62. The lower spring mount 52 is adapted to urge the lower head 36 towards the adjacent surface of lower disk 32. In addition, the lower spring mount 52 is adapted to permit the face of the lower head 36 to tilt slightly with respect the plane established by the adjacent surface of lower disk 32.

It may be seen from FIG. 5 that the longitudinal displacement of the heads and the axial displacement of the distal portion of the arm 22 permits the minimum axial distance 66 between the adjacent surfaces of upper disk 30 and lower disk 32 to be less than the minimum distance 44 of the prior art configuration shown in FIG. 2. The minimum distance 66 may be less than the sum of the axial distances from the face of each head to the attachment point of each associated spring mount on the arm 22. It should be noted that the axial distance between the uppermost surface of the interior portion of arm 22 and the lowermost surface of the displaced portion of the arm 22 is generally less than the axial distance between the faces of the upper and lower heads when the drive is in operation to avoid contact between the arm and the disks.

Figure 7:
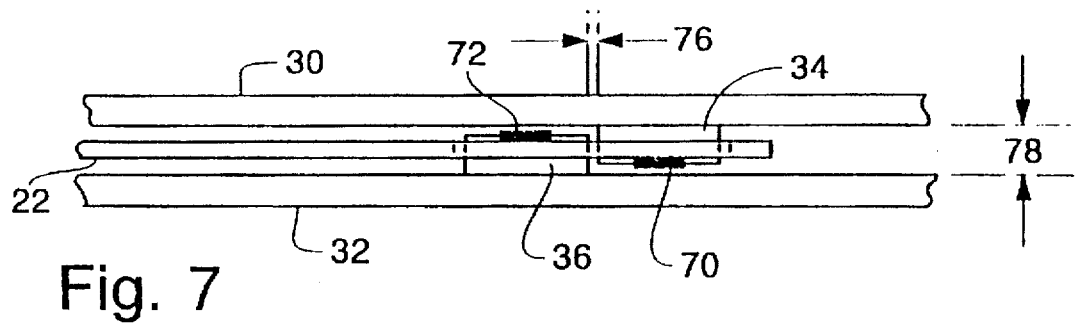
FIG. 7 is a partial side view of a single arm configuration according to the present invention where both magnetic heads are positioned in a aperture in the arm.
Figure 8:
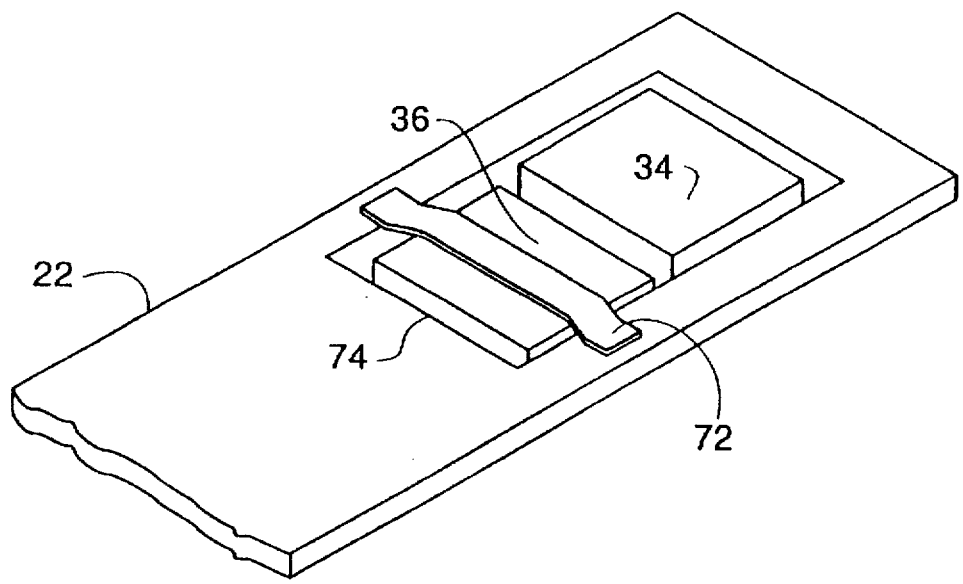
FIG. 8 is a perspective view of the arm configuration shown in FIG. 7 showing the positioning of the magnetic heads.

FIGS. 7 and 8 show an embodiment of an arm configuration according to the present invention where an aperture 74 is provided in the arm 22 and both upper head 34 and lower head 36 are positioned to protrude through the aperture 74. As FIG. 8 shows, the aperture 74 is sized so that the upper head 34 and the lower head 36 are positioned within the aperture without coming into contact with the edges of the aperture 74. Although the embodiment shown in FIGS. 7 and 8 shows a single aperture 74, it should be appreciated that two individual apertures may be employed, with one head positioned to protrude through each aperture.

Referring to FIG. 7, a portion of arm 22 is located between upper disk 30 and lower disk 32. Upper head 34 is positioned to permit reading and writing of information on the adjacent surface of upper disk 30. Similarly, lower head 36 is positioned to permit reading and writing of information on the adjacent surface of lower disk 32. The heads are displaced from each other along the longitudinal axis of the arm 22.

The upper head 34 is mounted on the arm 22 by an upper leaf spring mount 70, which is attached to the surface of the arm 22 which is adjacent to lower disk 32. Upper leaf spring mount 70 is also attached to a surface of the upper head 34. The lower head 36 is mounted on the arm 22 by a lower leaf spring mount 72, which is attached to the surface of the arm 22 which is adjacent to upper disk 30. Lower leaf spring mount 72 is also attached to a surface of the lower head 36. The upper leaf spring mount 70 may take various shapes, but is adapted to urge the upper head 34 towards the adjacent surface of upper disk 30. In addition, the upper leaf spring mount 70 is adapted to permit the face of the upper head 34 to tilt slightly with respect the plane established by the adjacent surface of upper disk 30. Similarly, the lower leaf spring mount 72 may take various shapes, and may differ in configuration from the upper leaf spring mount 70. The lower leaf spring mount 72 is adapted to urge the lower head 36 towards the adjacent surface of lower disk 32. In addition, the lower leaf spring mount 72 is adapted to permit the face of the lower head 36 to tilt slightly with respect the plane established by the adjacent surface of lower disk 32. The size and shape of aperture 74 must be sufficient to prevent the upper head 34 and the lower head 36 from contacting the edges of the aperture even when the heads is tilted, at least to the extent typically encountered during operation of the drive device. The longitudinal distance 76 between lower head 36 and upper head 34 must be sufficient to provide clearance between the heads but preferably is as small as possible to minimize the difference in the arcuate paths traced by the heads across each adjacent disk surface.

In FIG. 8, lower leaf spring mount 72 is shown as located generally transverse to the longitudinal axis of the arm 22, but it should be appreciated that the leaf spring mounts 70 and 72 may be attached at any location around the periphery of the aperture 74. Further, while the lower leaf spring mount 72 is shown as contacting a surface of the arm 22 at two separate locations, FIG. 8, a leaf spring mount may contact an arm surface at a single location, and is not required to extend across the head. As may be seen in FIG. 7, the axial distance from the surface of the arm 22 where the leaf spring mounts are attached to the farthest point on the leaf spring mount is preferably as small as possible, as this distance in part determines minimum axial distance 78.

It may be seen from FIG. 7 that the longitudinal displacement of the heads and the axial displacement of the distal portion of the arm 22 permits the minimum distance 78 between the adjacent surfaces of upper disk 30 and lower disk 32 to be less than the minimum distance 44 of the prior art configuration shown in FIG. 2. The minimum distance 78 may be less than the sum of the distances from the face of each head to the attachment points of the associated spring mount on the arm 22. As shown in FIG. 7, the offset of the heads in the axial direction must provide clearance between the adjacent surface of lower disk 32 and the upper leaf spring mount 70 and clearance between the adjacent surface of upper disk 30 and the lower leaf spring mount 72 while the drive is in operation. If the leaf spring mounts are recessed into the attaching surface of the magnetic head, or otherwise attached in a way that prevents the leaf spring mount from protruding above the surface of the head opposite the face of the head used to read and write information, the minimum distance 78 may be decreased to the sum of: 1) the axial clearance distance between the adjacent surface of the upper disk 30 and the face of upper head 34; 2) the axial thickness of the upper head 34; 3) the axial distance from the surface of upper head 34 opposite its face to the face of lower head 36; and 4) the axial clearance distance between the adjacent surface of the lower disk and the face of lower head 36.

Figure 9:
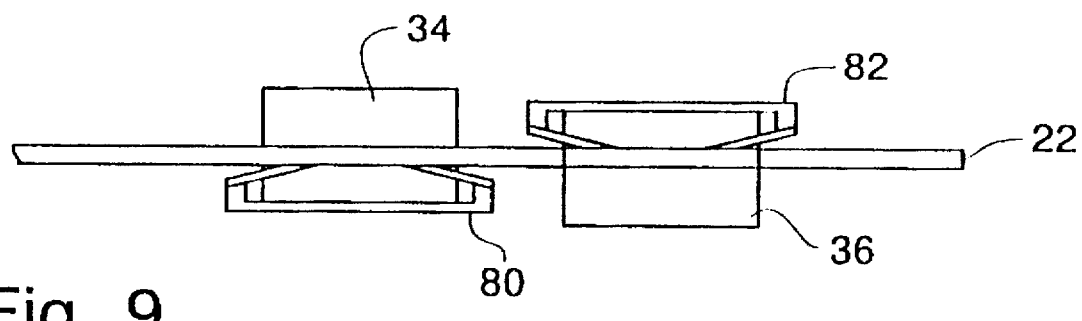
FIG. 9 is a partial side view of single arm configuration according to the present invention where spring mounts are formed from the arm.
Figure 10:
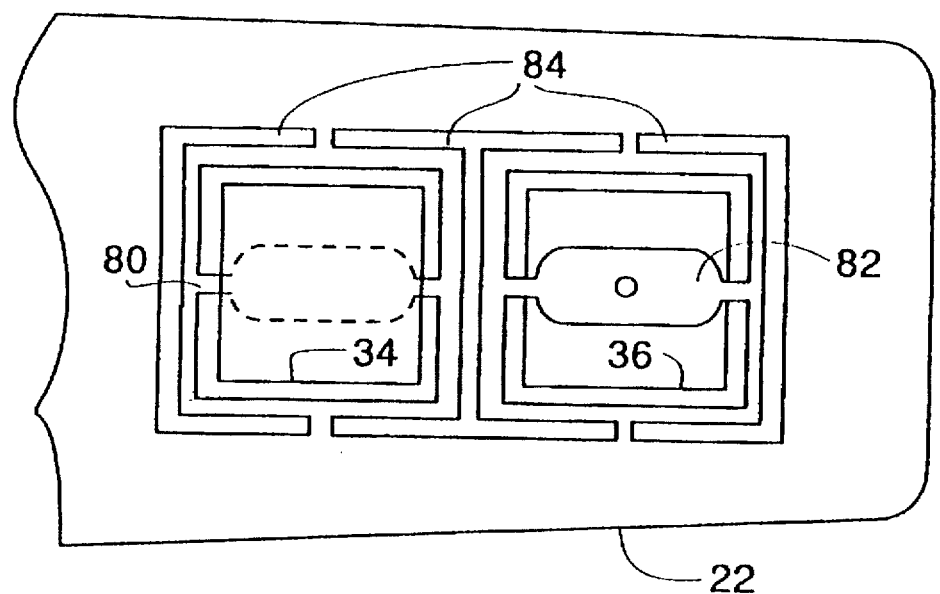
FIG. 10 is a top view of the arm configuration shown in FIG. 9 showing the apertures in the arm used to form the spring mounts.

FIGS. 9 and 10 show an embodiment of an arm configuration according to the present invention where upper spring mount 80 and lower spring mount 82 are formed from the material of the arm 22. Referring to FIG. 9, upper head 34 is positioned to permit reading and writing of information on the adjacent surface of an upper disk. Similarly, lower head 36 is positioned to permit reading and writing of information on the adjacent surface of a lower disk. The heads are displaced from each other along the longitudinal axis of the arm 22.

As FIG. 10 shows, the arm 22 contains apertures 84 of sizes and shapes which allows the upper spring mount 80 and the lower spring mount 82 to be formed by deforming portions of the material of the arm 22. Upper head 34 is mounted on the upper spring mount 80 and the lower head 36 is mounted on lower spring mount 82. Although the embodiment shown in FIG. 10 shows three apertures, it should be appreciated that various numbers of apertures and aperture configurations may be employed.

The upper spring mount 80 is adapted to urge the upper head 34 towards the adjacent surface of an upper disk. In addition, the upper spring mount 80 is adapted to permit the face of the upper head 34 to tilt slightly with respect the plane established by the adjacent surface of the upper disk. Similarly, the lower spring mount 82 may take various shapes, and may differ in configuration from the upper spring mount 80. The lower spring mount 82 is adapted to urge the lower head 36 towards the adjacent surface of a lower disk. In addition, the lower spring mount 82 is adapted to permit the face of the lower head 36 to tilt slightly with respect the plane established by the adjacent surface of the lower disk.

The offset of the heads in the axial direction must provide clearance between the adjacent surface of the lower disk and the upper spring mount 80 and clearance between the adjacent surface of the upper disk and the lower spring mount 82 while the drive is in operation. It may be seen from FIG. 9 that the longitudinal displacement of the heads and the use of integral spring mounts formed from the material of the arm 22 permits a the minimum distance between adjacent surfaces of an upper and lower disks to be less than the minimum distance 44 of the prior art configuration shown in FIG. 2. If the heads have substantially equal axial thickness, the minimum distance may be reduced to the sum of: 1) the axial clearance distance between the adjacent surface of the upper disk and the face of upper head 34; 2) the axial thickness of the upper head 34; 3) the axial thickness of the portion of upper spring mount 80 attached to the upper head 34; 4) the axial clearance distance from the surface of the spring mount 80 which is adjacent to the lower disk to the face of the lower head 36 and 5) the axial clearance distance between the adjacent surface of the lower disk and the face of lower head 36.

In the embodiments of the present invention described above the spring mounts used to attach the heads to the arm are adapted to urge the attached head toward an adjacent disk surface while permitting the face of the head to tilt slightly with respect the plane established by the adjacent disk surface. The freedom of the head face to tilt with respect to the disk surface is necessary for the purpose of accurately positioning the heads relative to the disk surface during operation, and generally does not exceed approximately 1 degree from parallel to the plane of the disk surface, although spring mounts which permit both greater and lesser movement may be employed.

As shown in FIGS. 3 through 8, the spring mounts are generally connected to the arm 22 at regions of the arm adjacent to the attached magnetic head. Each spring mount is connected to a region of the arm which is closer to the attached head than to the axis of rotation of the arm 22. In addition, the longitudinal extent, or length measured in the direction of the longitudinal axis of the arm, of each spring mount is less than the longitudinal distance from the axis of rotation of the arm to the distal end of the arm. Typically, the longitudinal extent of the spring mount is closer to the longitudinal extent of the head which is attached to the spring mount than to the longitudinal distance from the axis of rotation of the arm to the distal end of the arm. The longitudinal extent of the spring mount is less than the length of the arm and preferably less than half of the length of the arm. In some cases, the longitudinal extent of the spring mount is less than the longitudinal extent of the attached magnetic head. While the embodiments shown in FIGS. 3 through 8 are depicted as using a spring mount which is attached to the arm 22, it should be appreciated that the spring mounts may also be formed from the material of the arm 22, like those shown in FIGS. 9 and 10. In some cases, forming the spring mounts from the material of the arm can reduce the costs of manufacture and assembly, as well as reducing the mass of the arm assembly.

Since the spring mounts also exert force on the arm from both directions when the drive is in operation, the forces imparted to the arm through the spring mounts tend to stabilize the position of the arm with respect to the adjacent disk surfaces. Accordingly, while sufficient rigidity must be maintained in the arm to position the heads accurately along the arcuate path, the opposed stabilizing forces imparted through the spring mounts allows the use of an arm structure which may be less rigid with respect to deformation perpendicular to the adjacent disk surfaces than with respect to rotary movement about the axis of rotation of the arm. Reduction in the need for rigidity provides can permit a reduction in the mass of the arm, with a corresponding reduction in the inertia of the arm during operation of the drive.

In a further embodiment of the present invention, an arm having only a single attached magnetic head (not shown) is attached to an arm assembly which rotates about axis of rotation 22a for the purpose of reading and writing of information on the uppermost surface of the uppermost disk. A similar arm may be attached to the arm assembly for the purpose of reading and writing of information on the lowermost surface of the lowermost disk.

In a still further embodiment of the present invention, when more than two disks are included in the disk stack, multiple arms, as discussed above, may be combined in an arm assembly which rotates as a unit about axis of rotation 22a, each arm providing access to a different disk or set of disks in the disk stack.

The foregoing discussion has been presented for purposes of illustration and description. Further, the description is not intended to limit the invention to the form disclosed herein. In particular, it should be appreciated that while terms indicating relative direction, such as upper and lower, have been used in describing the invention, such terms are not intended to limit the invention to the orientation and configurations shown. Variation and modification commensurate with the above teachings, within the skill and knowledge of the relevant art, are within the scope of the present invention. The embodiments described herein above are further intended to explain the best modes presently known of practicing the invention and to enable others skilled in the art to utilize the invention as presented, or in other embodiments, and with the various modifications required by their particular applications or uses of the invention. It is intended that the appended claims be construed to include alternative embodiments to the extent permitted by the prior art.

What is claimed is:

1. A magnetic disk drive apparatus, comprising:

a rotatable stack of magnetic disks each having opposed disk faces, wherein the rotatable stack has an axis of rotation;

a rotatable positioning arm having a longitudinal axis and an axis of rotation which is perpendicular to said longitudinal axis and parallel to the axis of rotation of the rotatable stack, said positioning arm having a first aperture;

first spring means for connecting a magnetic head to said positioning arm;

a first magnetic head mounted on said first spring means, the face of said first magnetic head positioned for reading or writing of information on an adjacent disk face of a first magnetic disk and said first spring means is connected to said positioning arm in a region which is closer to said first magnetic head than to the axis of rotation of said positioning arm, wherein a portion of the first magnetic head is located within said first aperture in said positioning arm;

second spring means for connecting a magnetic head to said positioning arm; and a second magnetic head mounted on said second spring means such that the second magnetic head is longitudinally displaced from said first magnetic head along the longitudinal axis of said positioning arm and said second magnetic head is farther from the axis of rotation of said positioning arm than said first magnetic head, the face of said second magnetic head positioned for reading or writing of information on an adjacent disk face of a second magnetic disk which is displaced from said first magnetic disk along the axis of rotation of the stack of magnetic disks and said second spring means is connected to said positioning arm in a region which is closer to said second magnetic head than to the axis of rotation of the positioning arm, a portion of the second magnetic head being located within said first aperture in the positioning arm.

2. An apparatus, as claimed in claim 1, wherein:

said first spring means is connected to said positioning arm by being integrally formed therewith and said second spring means is connected to said positioning arm by being integrally formed therewith.

3. A magnetic disk drive apparatus, comprising:

a rotatable stack of magnetic disks each having a radius and opposed disk faces including a first magnetic disk and a second magnetic disk and in which said rotatable stack has an axis of rotation;

a rotatable, elongated member having a longitudinal extent and at least a first bend adjacent a free end of said member, wherein said longitudinal extent includes a first length before said first bend and a second length after said first bend in which said second length after said first bend is substantially less than said first length before said first bend;

a first element joined to said member;

a first magnetic head connected to said member using said first element and having a face with said face of said first magnetic head positioned for reading or writing information on an adjacent disk face of said first magnetic disk and wherein said first element alone urges said first magnetic head towards said first magnetic disk;

a second element joined to said member; and a second magnetic head also connected to said member while using said second element and being displaced from said first magnetic head along said member, said second magnetic head having a face with said face being positioned for reading or writing information on an adjacent disk face of said second magnetic disk and wherein said second element alone urges said second magnetic head toward said second magnetic disk;

wherein only said member having a longitudinal extent that is greater than one-half of said radius of said magnetic disks is provided between said first and second magnetic disks for supporting said first and second magnetic heads.

* * * * *